United States Patent [19]
Vanden Heuvel et al.

[11] Patent Number: 5,924,014
[45] Date of Patent: Jul. 13, 1999

[54] METHOD AND APPARATUS FOR ADAPTIVE ROUTING IN A SATELLITE-BASED COMMUNICATION SYSTEM

[75] Inventors: Dean Paul Vanden Heuvel; Brent Matthew McKay; Bradley Robert Schaefer; James William Bishop, Jr., all of Chandler, Ariz.

[73] Assignee: Motorola, Inc., Schaumburg, Ill.

[21] Appl. No.: 08/724,607

[22] Filed: Sep. 30, 1996

[51] Int. Cl.$^6$ ................................................... H04B 7/185
[52] U.S. Cl. .......................... 455/13.1; 455/430; 455/8; 455/12.1; 370/323
[58] Field of Search ..................................... 455/427, 428, 455/430, 431, 445, 436, 8, 12.1, 11.1, 13.1, 67.1, 505; 370/323, 237, 325

[56] References Cited

U.S. PATENT DOCUMENTS

| | | | |
|---|---|---|---|
| 5,394,561 | 2/1995 | Freeburg | 455/13.1 |
| 5,430,729 | 7/1995 | Rahnema | 270/94.1 |
| 5,490,284 | 2/1996 | Itoh et al. | 455/11.1 |
| 5,509,004 | 4/1996 | Bishop, Jr. | 455/12.1 |

FOREIGN PATENT DOCUMENTS 2 022 365  12/1979  United Kingdom ............. H04Q 7/04

*Primary Examiner*—Reinhard J. Eisenzopf
*Assistant Examiner*—Darnell R. Armstrong
*Attorney, Agent, or Firm*—Sherry J. Whitney; Frank J. Bogacz

[57] ABSTRACT

In satellite based communication systems (30), real time monitoring of communication links (23–25) and the subsequent adaptations to overcome problems with certain links (23,25) provides the communication system (30) with the ability to adapt to changing conditions. A satellite-based communication system (30) can be adapted to provide an improved method for establishing communication links (23, 25) between ground stations (14) and space-based satellite switches (11). Common earth-based termination nodes are replaced by intelligent switches (14). Alternate links are established using links (20,21) between intelligent space-based switches (11), links (24) between intelligent earth-based switches (14), and links (23,25) between intelligent space-based switches (11) and intelligent earth-based switches (14). The controller (54) in the intelligent earth-based switch (14) allows the system to automatically adapt to failure, overload, and other conditions.

6 Claims, 3 Drawing Sheets

5,924,014

METHOD AND APPARATUS FOR ADAPTIVE ROUTING IN A SATELLITE-BASED COMMUNICATION SYSTEM

CROSS REFERENCE TO RELATED APPLICATION

The present invention is related to U. S. patent application Ser. No. 08/537,382, entitled "Method and Apparatus for Providing Continuity of Communications In a Satellite-Based Telecommunication System", filed Oct. 2, 1995 which is assigned to the same assignee as the present invention.

FIELD OF THE INVENTION

The present invention relates to satellite communications and more particularly to a method and apparatus for providing adaptive communication routes.

BACKGROUND OF THE INVENTION

Prior art space-borne communication systems consist of satellite vehicles which form the space segment and terrestrial components which form the ground segment to facilitate communications from any near-earth position to any other near-earth position. In a typical communication scenario, messages which can be data and/or voice are sent from the initiating near-earth user, possibly via an intervening space link, through a ground station to the space segment, then through multiple elements in the space segment, and finally back to earth via a second ground station, and ultimately routed to the terminating near-earth user. For this method to work reliably, it is critical that at least one route through the space segment be operational and that the terminating space-to-ground links, facilitated by the ground station, be operational. Failure to provide at least one route through the space segment or a failure in any of the terminating space-to-ground links will result in a lack of connectivity to portions of the globe.

Within prior art system design, connectivity to an entire terrestrial service area depends on the viability of the active space/ground link supported by the ground station. Any failure within that link will result in system outages. Additionally, prior art approaches to solving this problem are overly complex, requiring active coordination of multiple system components directed by a central control authority.

Within multiple satellite communication systems which employ constellations of orbiting satellites, either due to early constellation population considerations or satellite failures, "holes" can exist. When one of these holes covers a ground station area, connectivity to that area is lost.

Existing system design limits the positioning of ground stations such that a limited number of ground stations may be placed within the "footprint" of a single satellite, due to the satellite's limited resources (i.e., antennae) with which to implement space-to-ground links. Also, constellation traffic into or out of a single ground station is limited by the capacity of the supported space/ground link. This forces large cost and complexity increases as the traffic volume increases. Further, existing systems are limited in their ability to efficiently optimize operation for cost-per-packet considerations. These factors are not taken into account when data is transported.

Additionally, global communication does not occur in a equally distributed fashion about the globe, either in space or time. Most often, the volume of traffic expected in a communication system in any part of the world is highly dependent on the time of day and the day of the week, resulting in periods of relatively low activity and other periods of intense activity. Current global system designs exhibit throughput limitations or "bottlenecks" caused by this characteristic unbalanced system loading. Unfortunately, prior art satellite networks are somewhat limited in their ability to alleviate congestion situations without the invention. This forces the system designers to choose between specifying a system which is capable of handling peak loads, leaving excess network capacity un-utilized over large periods of time, or designing a limited system which is unable to support peak demand.

Therefore, there is a substantial need to provide a method and suitable apparatus for maintaining continuity of service in a global communication system despite interruptions in the satellite-to-ground radio frequency communication links.

There is also a substantial need to provide such a method and apparatus which can minimize the effect of substantial changes in the system network while still providing the necessary continuity of service.

BRIEF DESCRIPTION OF THE DRAWINGS

A more complete understanding of the present invention can be derived by referring to the detailed description and claims when considered in connection with the Figures, wherein like reference numbers refer to similar items throughout the Figures, and:

DETAILED DESCRIPTION OF A PREFERRED EMBODIMENT

Figure 1:
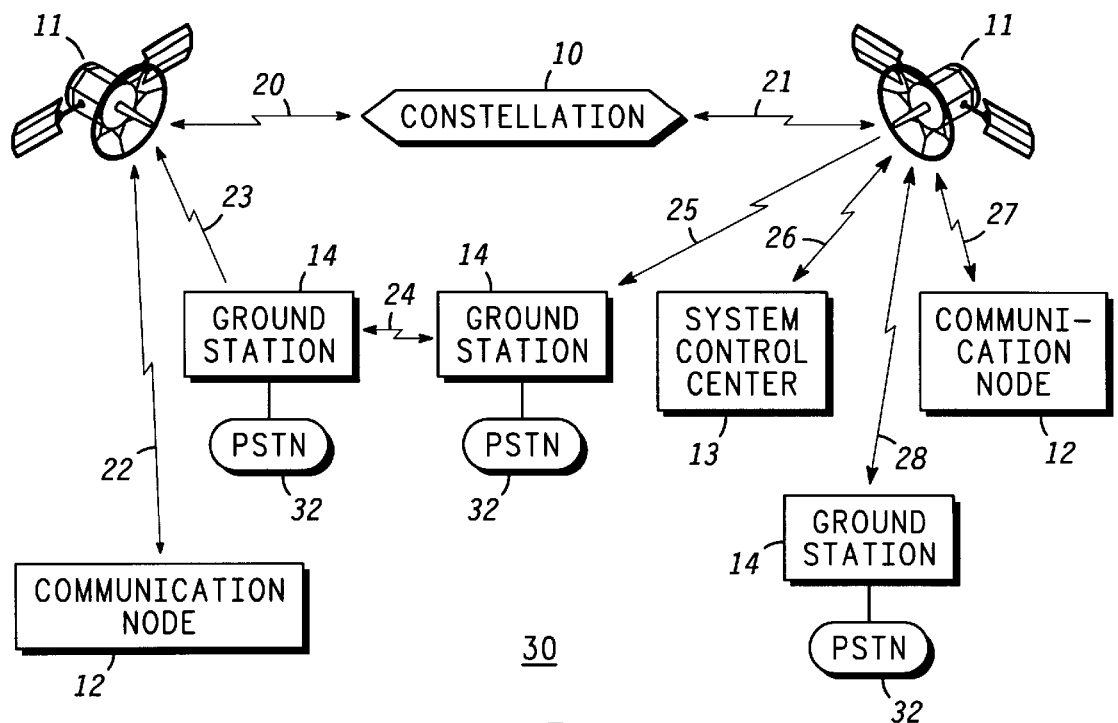
FIG. 1 shows a block diagram of a satellite-based communication system in accordance with a preferred embodiment of the present invention.

The present invention describes a satellite-based communication system that has been adapted to provide an improved method for establishing communication links between ground stations and space-based satellite switches. "Common" earth-based termination nodes are replaced by "intelligent" switches. Alternate links are established using links between intelligent space-based switches, links between intelligent earth-based switches, and links between intelligent space-based switches and intelligent earth-based switches. The processor in the intelligent earth-based switch allows the system to automatically adapt to failure, overload, and other re-routing conditions.

In a preferred embodiment, the ground segment of satellite-based communication system is formed using terrestrial links and intelligent ground stations which are used as switches. In such a system, ground stations link terrestrial communications facilities to and from the space-borne backbone. In prior art systems, all communications between the system users are carried by the space-borne backbone. In a preferred embodiment of the present invention, an alternative link capability is established by linking these ground station facilities together in an intelligent manner.

In the prior art, the operation of the ground station elements involves transport of data packets in two directions. Transport of data from the ground segment to the space segment is referred to as packet "uplink", while data transport from the space segment to the ground is called packet "downlink". In a preferred embodiment of the present invention, a third direction for data transport within the communication system is established using the ground segment. This third direction for data transport is called packet "terrestrial crosslink". In the "terrestrial crosslink", native system packets are transported via terrestrial links from one ground station to another ground station.

In the prior art, the ground entities are responsible for not only transport (uplink and downlink) of the backbone packets, but also for conversion of data to/from the system native packets from/to a format which is compatible with the existing terrestrial telephone networks.

In the prior art design, when downlink packets are received by the ground entities, any packet which is not intended for that ground entity is discarded. In a preferred embodiment of the present invention, ground stations accept all downlink packets bound for any destination. Ground station controllers determine which uplink data packets to route via space links and which uplink data packets to route via the terrestrial links.

Similarly, in the prior art design, all uplink packets are sent via the ground entity's packet handling component to the satellite link. No consideration is given to the packet destinations or current system resource limitations, including the volume of traffic currently being handled by the target ground/space link. In a preferred embodiment of the present invention, a ground station controller is incorporated into the ground stations. This ground station controller monitors uplink packet traffic, and makes a space vs. ground routing decision including (but not limited to) factors such as current traffic flow, economics, and network health status.

Additionally in prior art systems, some constellation configurations can induce an inordinate delay due to "crosslink" connectivity, or the lack thereof. This invention provides a means of minimizing the delay, or latency, as seen by the system users.

FIG. 1. shows a block diagram of a satellite-based communication system 30 in accordance with a preferred embodiment of the present invention. Constellation 10 includes communication satellites 11, a system controller 13, and ground stations 14. To simplify the understanding of the present invention, only two communication satellites are shown in FIG. 1, but more may be present. Also, to simplify the understanding of the present invention, only two ground stations 14 are shown in FIG. 1, but more may be present. Communication satellites 11 are in data communication with one another through data communication links 20 that are provided by constellation 10. In addition, communication satellites 11 are linked to communication nodes 12 through links 22,27. Also communication satellites 11 are linked to ground stations 14 through links 23,25.

Ground stations 14 are located at various locations proximate to the surface of the earth. In a preferred implementation, all ground stations are connected together via terrestrial link facilities 24, which remain active at all times. These facilities may be custom implementations or may utilize existing terrestrial facilities to link the various ground site sites. Terrestrial links 24 are treated as "additional or alternate links" for purposes of native network traffic handling. Links 24 are utilized to transport native system packets to and from other ground segment ground stations. Those skilled in the art will appreciate that links 24 can be implemented as fiber optic cable, microwave network, T1 or other wireline network or the like.

Grounds stations 14 are typically connected to a terrestrial system such as a Public Switched Telephone Network (PSTN) 32 and/or a terrestrial cellular system, for example. Ground stations 14 basically function as an interface between the terrestrial system users and the rest of the network.

In a preferred embodiment, system 30 also could include a system control center 13 which controls some operations of the space and/or terrestrial segments. System control center 13 connects to space segment over link 26.

Figure 2:
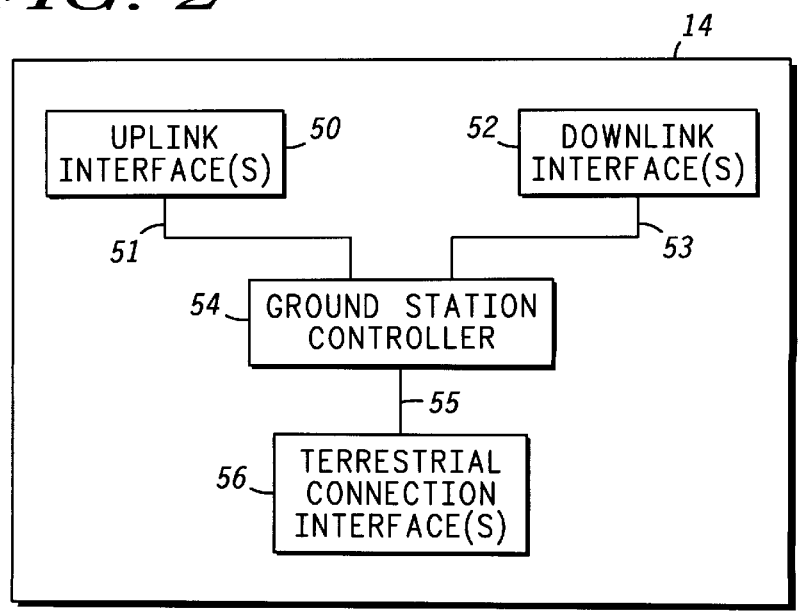
FIG. 2 shows a block diagram of a ground station which is an earth-based intelligent switch that operates within a satellite-based communication system and provides earth-based links and earth-to-space links in accordance with a preferred embodiment of the present invention.

FIG. 2. shows a block diagram of a ground station 14 (FIG. 1) which is an earth-based intelligent switch that operates within a satellite-based communication system and provides terrestrial links 24 (FIG. 1) and earth-to-space links 23,25 (FIG. 1) in accordance with a preferred embodiment of the present invention.

Uplink interface 50 is shown to depict a mechanism for establishing links 23,25 (FIG. 1) with communication satellites 11 (FIG. 1). It will be understood that while each ground station 14 is illustrated in FIG. 2 as having a single uplink interface 50 for establishing links 23,25 (FIG. 1 ), each ground station 14 could comprise several uplink interfaces 50, so that ground station 14 can communicate with more than one satellite at a time, for example, with an approaching satellite and with a receding satellite simultaneously. Path 51 is shown to depict a means for establishing data links between uplink interfaces 50 and ground station controller 54. Data packets are sent to ground station controller 54 using link 51. Also, it will be understood that while each ground station 14 is illustrated in FIG. 2 as having a single path 51, each ground station 14 could comprise several paths, so that more than one of uplink interfaces 50 can communicate with ground station controller 54 at one time.

Downlink interface 52 is shown to depict a mechanism for establishing links 23,25 (FIG. 1) with communication satellites 11 (FIG. 1). It will be understood that while each ground station 14 is illustrated in FIG. 2 as having a single uplink interface 52 for establishing links 23,25 (FIG. 1), each ground station 14 will typically comprise several downlink interfaces 52, so that ground station 14 can communicate with more than one satellite at a time, for example, with an approaching satellite and with a receding satellite simultaneously. Path 53 is shown to depict a means for establishing data links between downlink interfaces 52 and ground station controller 54. Data packets are received from ground station controller 54 using link 53. Also, it will be understood that while each ground station 14 is illustrated in FIG. 2 as having a single path 53, each ground station 14 will typically comprise several paths, so that more than one of downlink interfaces 52 can communicate with ground station controller 54 at one time.

Terrestrial connection interface 56 is shown to depict a mechanism for establishing links 24 (FIG. 1) with other ground stations 14 (FIG. 1). It will be understood that while each ground station 14 is illustrated in FIG. 2 as having a single terrestrial connection interface 56 for establishing links 24 (FIG. 1), each ground station 14 will typically comprise several terrestrial connection interfaces 56, so that ground station 14 can communicate with more than one other ground station at a time, for example, with at least two of its nearest neighboring ground stations simultaneously. Path 55 is shown to depict a means for establishing data links between terrestrial connection interfaces 56 and ground station controller 54. Data packets are sent to and received from ground station controller 54 using link 56. Also, it will be understood that while each ground station 14 is illustrated in FIG. 2 as having a single path 55, each ground station 14 could comprise several paths, so that more than one of terrestrial connection interfaces 56 can communicate with ground station controller 54 at one time.

Ground station controller 54 is used to control ground station 14. Ground station controller 54 determines which data packets to send via links 23,25. Ground station controller 54 sends outgoing data packets to uplink interface 50 via link 51. Ground station controller 54 determines which data packets should not be sent to uplink interface 50 and sends these data packets to terrestrial connection interface 56 via link 55. Ground station controller 54 also receives incoming data packets on link 53. Ground station controller 54 also can receive incoming data packets from terrestrial connection interface 56 via link 55. Incoming data packets could be received, for example, when another ground station received a data packet destined for ground station 14. This might occur because some problem with the downlink to ground station 14 precluded sending the packet directly to ground station 14.

Figure 3:
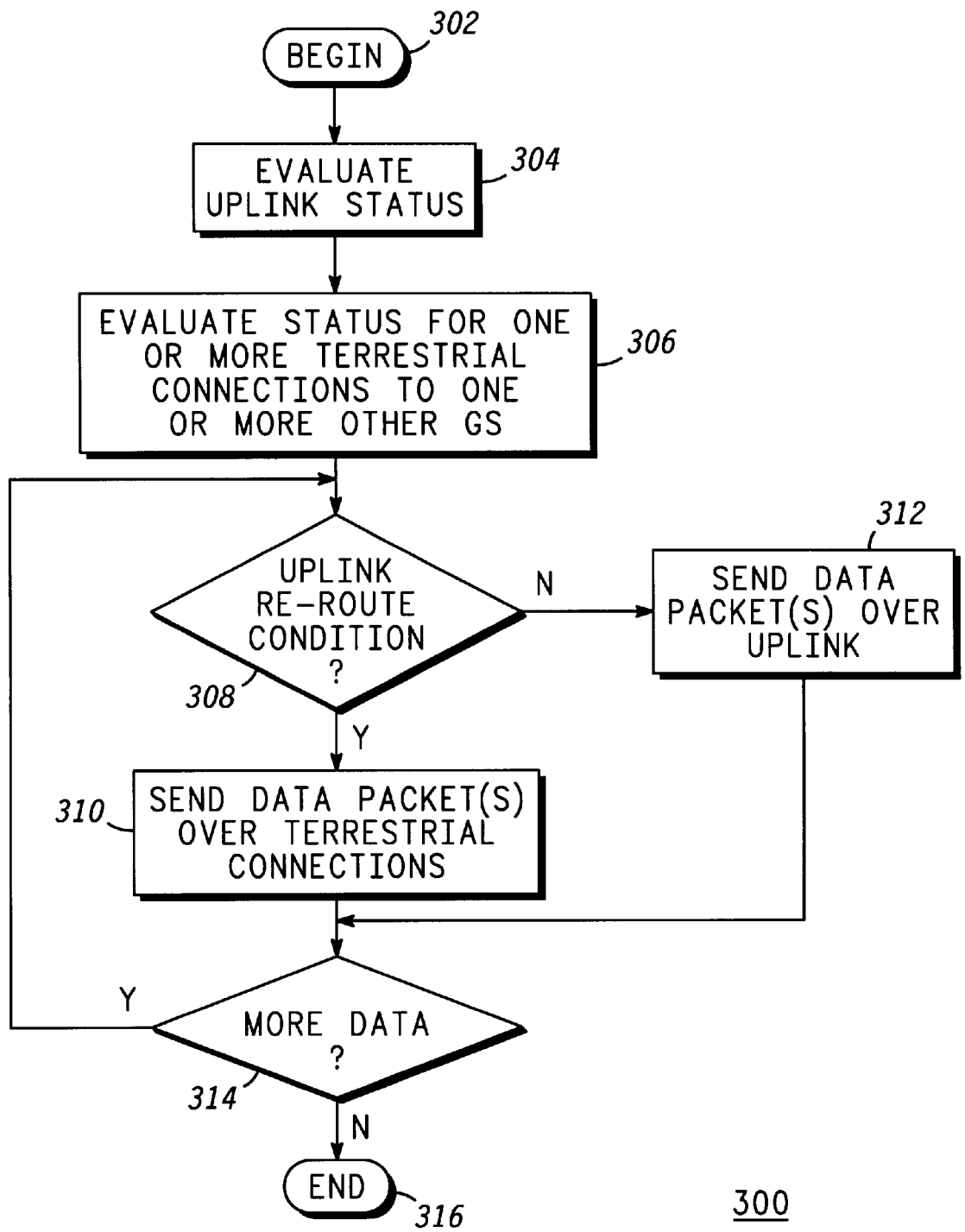
FIG. 3 shows a flow chart for a procedure to route signals when an uplink re-route condition exists in accordance with a preferred embodiment of the present invention.

FIG. 3 shows a flow chart for a procedure to route signals when an uplink re-route condition exists in accordance with a preferred embodiment of the present invention. Uplink re-route condition determining procedure 300 starts in step 302, for example, when uplink data is available. In step 304, an uplink communication channel between a ground station and a space-based switch is evaluated. The results of this evaluation of the uplink are recorded and these results help to determine the status of the space-to-ground link. In step 306, in a preferred embodiment of the present invention one or more of the terrestrial connections with other ground stations are evaluated. This step determines the status for the ground segment. This involves determining the current status for all of the earth-based switches and the communication links between the earth-based switches. In step 308, a query is performed to determine if some re-route condition exists which warrants re-routing of one or more data packets. A re-route condition could be, for example, based such factors as current traffic flow, economics, and network health status. If a re-route condition exists, then the process branches to step 310 and one or more data packet are sent over a terrestrial route and procedure 300 continues with step 314. In a preferred embodiment, the data packets are sent over a "best" terrestrial route. The best terrestrial route can be determined using variables such as delay, cost, and link loading. If a re-route condition does not exist, then the process branches to step 312 and the data packets are sent over the uplink and procedure 300 continues with step 314. In step 314, a query is performed to determine if additional data packets need to be sent. If more data exists then procedure 300 branches to step 308 to evaluate the re-route condition again. If there is no more data to send at the present time, then procedure 300 branches to step 316 and ends.

Figure 4:
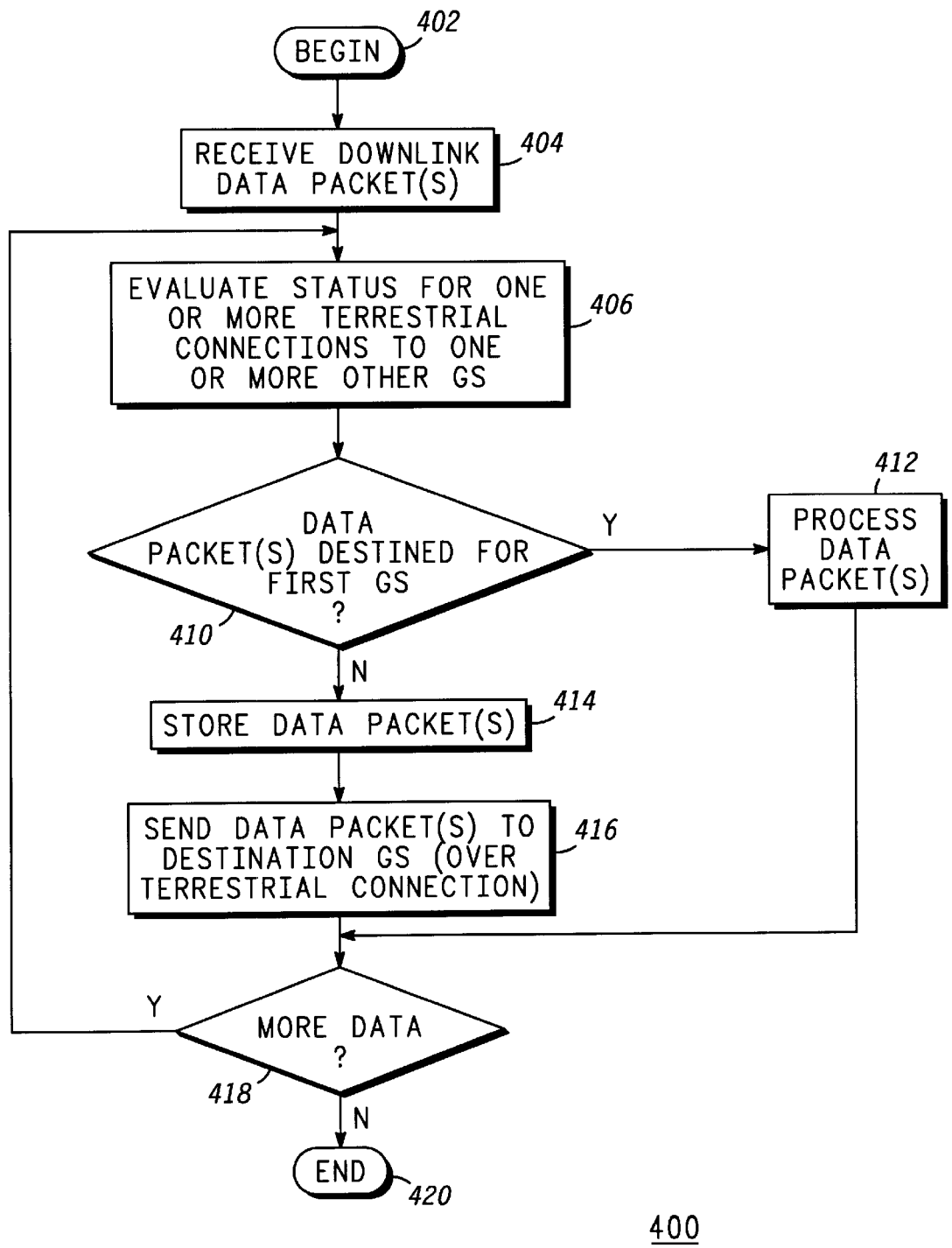
FIG. 4 shows a flow chart for a procedure to route signals when a downlink re-route condition exists in accordance with a preferred embodiment of the present invention.

FIG. 4 shows a flow chart for a procedure to route signals when a downlink re-route condition exists in accordance with a preferred embodiment of the present invention. Downlink re-route condition determining procedure 400 starts in step 402, for example, when data arrives. In step 404, downlink data packets are received. When one ground station downlink is not functioning well, a second ground station receives data packets from the first ground station. The second ground station sends the data packet over the terrestrial link to the first ground station. In step 406, in a preferred embodiment of the present invention one or more of the terrestrial connections with other ground stations are evaluated. This step determines the status for the ground segment. In step 410, a query is performed to determine if the received data packets are destined for this ground station or not. If the data packets are destined for this ground station, then the process branches to step 412 and the data packets are processed. If the data packets are not destined for this ground station, then the process branches to step 414 and the data packets are stored and procedure 400 continues with step 416. In step 416, the data packets are sent to the next ground station over the terrestrial links. In step 418, a query is performed to determine if additional data packets need to be received. If more data exists then procedure 400 branches to step 408 to evaluate the re-route condition again. If there is no more data to receive at the present time, then procedure 400 branches to step 418 and ends.

The present invention facilitates handling of traffic via a single ground station in excess of the capacity of the space to ground link supported by the ground station. To implement this, excess uplink packet traffic is routed via the terrestrial component to an alternate ground station for uplink via a link which is currently sparsely loaded. The processor which performs this routing decision may determine which packets are ultimately targeted for another ground station site and route those via terrestrial links, while routing all satellite delivered traffic (e.g., traffic destined for a user unit directly communicating with a satellite entity, without an intervening ground station) via the space link, for example.

Alternatively, the controller may select terrestrial versus space links on a cost-per-packet basis, dictated by the time-of-day or other factors. Downlink data destined for a ground station in excess of current link capacity may be routed to an alternate space to ground link (e.g., at another, less loaded ground station) and ultimately routed to the destination ground station via the terrestrial link to the target ground station. In this manner, a ground station can be designed for a lower link capacity, yet still support a higher volume of peak traffic.

The present invention facilitates economic based facility decision as well. The ground station controller may make an uplink routing decision based upon current cost to transport a single packet using either the space link or terrestrial link, thus minimizing the cost per packet transported.

A key advantage of the present invention is the ability to automatically adapt to varying network conditions, including link failures and overloads. When the ground station controller detects traffic volume which is nearing (or at) capacity, alternate links can be immediately pressed into increased service. This reaction is independent of the cause of the overloading (e.g., either system component failure or simple increased demand). In this manner, the system adapts to the current load in a most efficient manner. This feature allows designers to relax capacity specifications from those which are necessary to address peak traffic.

The present invention facilitates a power saving method in the satellite component as well. In a situation where a single satellite is supporting active links to more than one ground station, one of these ground station links may be terminated and, using the ground stations, traffic destined for the other ground station link can be rerouted to an alternate space to ground link supported by another satellite. Alternatively, this multiple link traffic could be combined (if current capacity allows) into a single supported downlink, allowing the satellite to terminate the additional active links, thus saving power.

In some constellation configurations, particularly when there are constellation holes due to satellite failure or prior to a fully populated constellation, it may be much more efficient to utilize grounds links for at least a portion of a packet's route. In fact, there will be many situations in which a given ground station does not have connectivity to the network via the space links. But, it is imperative that the system provide continuous service. Also, in some constellations, an inter-connection condition could exist which prevents the timely packet routing between some satellites in the constellation. To alleviate this condition in the prior art design, a packet must be sent to an alternate constellation satellite for delivery to its ultimate destination. This invention addresses both of these conditions by facilitating an alternate route, most likely one with far less inherent delay, for packet transport.

In a preferred embodiment, it is expected that the terrestrial links required by the present invention could be provided by existing telephony infrastructure or custom configured, installed and dedicated to the apparatus of the invention. The method and application of the present invention is independent of this consideration.

An alternative implementation of the method and apparatus of the present invention would utilize enhanced capability within the ground station to "pack/unpack" the native mode data such that it is compatible with currently existing telephony networks, and to route terrestrial data via the PSTN network to the other ground stations. Note that this method is more complex, and increases resource demands within the ground station, when compared with the preferred implementation.

The present invention improves reliability of prior art satellite-based communication networks, while increasing available capacity above what is currently supported for any ground based component. In effect, the invention melds multiple ground to space links into a "virtual link". The present invention allows for ground infrastructure, and associated traffic volume capacity which exceeds the capacity of the ground station's space to ground link, utilizing a "virtual space to ground link".

Multiple ground stations could be placed within a single satellite footprint. This number is not limited by the satellite multiple-link capabilities, as is the case with the prior art system. This allows more system revenue through the marketing of additional ground stations.

The present invention allows the creation and marketing of a "minimal" ground station configuration which would employ no space/ground links. This ground station configuration would utilize the present invention to implement a virtual space/ground link. Once again, revenue can be increased. This minimal ground station can also be used to allow an operator to establish a ground station without antennas. This could result, for example, if there were problems with a license to operate an RF antenna in a particular country.

Prior art system design forces a complex implementation and methodology to react to a failure or decreased traffic carrying ability with any ground entity's space/ground link for any reason, including satellite full or partial failures or non-population of the constellation. The method and apparatus of the present invention alleviates this concern without any "reaction" time necessary. In fact, the method and apparatus of the present invention handles this case as a non-issue.

The present invention has been described above with reference to preferred embodiments. However, those skilled in the art will recognize that changes and modifications can be made in these preferred embodiments without departing from the scope of the present invention. For example, while preferred embodiments have been described in terms of using specific procedures as shown in FIG. 3 an FIG. 4 for determining re-route conditions, other procedures or methods can also be employed. Accordingly, these and other changes and modifications which are obvious to those skilled in the art are intended to be included within the scope of the present invention.

What is claimed is:

1. A method for routing data through a satellite communication system comprising a plurality of communication satellites which operate as intelligent space-based data packet switches, wherein said plurality of communication satellites are coupled to each other using crosslinks, are coupled to multiple ground stations, and are coupled to a plurality of communication nodes, the method comprising the steps of:

a) establishing, by a first ground station, an uplink communication channel for carrying native system data packets between said first ground station and a satellite of said plurality of communication satellites;

b) establishing, by said first ground station, one or more terrestrial connections between said first ground station and a second ground station, said one or more terrestrial connections establishing a terrestrial crosslink which provides an alternate communication channel for transporting said native system data packets between said first ground station and said second ground station;

c) determining whether a re-route condition exists for which re-routing of at least one native system data packet is desired, said re-route condition existing when said uplink communication channel experiences a service issue;

d) when said re-route condition exists, sending said at least one native system data packet over said alternative communication channel to said second ground station, without conversion to a format which is compatible with existing terrestrial telephone networks;

e) establishing, by said second ground station, an alternate uplink communication channel for carrying data as native system packets between said second ground station and a second satellite of said plurality of satellites; and f) sending, by said second ground station, said at least one native system data packet to said second satellite using said alternate uplink communication channel.

2. The method as claimed in claim 1 further comprising the step of:

g) when said re-route condition does not exist, sending said at least one native system data packet on said uplink communication channel.

3. A method for receiving data from a satellite of a communication system, wherein said communication system comprises a plurality of satellites which operate as intelligent space-based data packet switches, wherein said plurality of satellites are coupled together using crosslinks and are coupled to multiple ground stations which act as intelligent earth-based data packet switches for said communication system, the method comprising the steps of:

a) establishing, by a first ground station, a downlink communication channel for carrying the data as native system packets between said first ground station and said satellite;

b) establishing, by said first ground station, one or more terrestrial connections between said first ground station and at least one other ground station, said one or more terrestrial connections establishing a terrestrial crosslink which provides an alternate link for transporting the data as said native system packets;

c) receiving a data packet via said downlink communication channel formatted as a native system packet;

d) evaluating, by said first ground station, a destination address within said data packet to determine whether said first ground station is a destination of said data packet;

e) when said first ground station is not the destination of said data packet, sending said data packet over a terrestrial connection to a second ground station as a native system packet;

f) establishing, by said second ground station, one or more uplink connections between said second ground station and a second satellite of said plurality of satellites, said one or more uplink connections providing an alternate uplink for transporting said native system packets;

g) evaluating, by said ground station, said destination address within said data packet to determine whether said second ground station is the destination of said data packet; and h) when said second ground station is not the destination of said data packet, sending said data packet over said alternate uplink as a native system packet to said second satellite.

4. A method as claimed in claim 3, wherein step e) is preceded by the step of:

storing said data packet as a native system packet.

5. A ground station for use in a satellite communication system comprising said ground station, at least one other ground station, and a plurality of communication satellites which are coupled together using a plurality of crosslinks, wherein said ground station and said at least one other ground station are coupled together using at least one terrestrial channel and are coupled to certain ones of said plurality of communication satellites using at least one uplink communication channel and at least one downlink communication channel, said ground station comprising:

a) a ground station controller for controlling the operation of said ground station by routing a data packet over an uplink communication channel when said controller determines said uplink communication channel is not experiencing a problem, and by routing said data packet over a terrestrial channel without converting said data packet, when said controller determines said uplink communication channel is experiencing a problem, said terrestrial channel providing an alternate channel for transporting said data packet to a second ground station;

b) an uplink interface, coupled to said ground station controller, for establishing the uplink communication channel with said certain ones of said plurality of communication satellites;

c) a downlink interface, coupled to said ground station controller, for establishing a downlink communication channel with said certain ones of said plurality of communication satellites; and d) a terrestrial connection interface, coupled to said ground station controller, for establishing said terrestrial channel between said first ground station and said second ground station to send said data packet without converting said data packet to a format which is compatible with existing terrestrial telephone networks, wherein said ground station controller further operates as an intelligent earth-based packet switch for processing data packets formatted as native system packets, for determining when said data packets are destined for said ground station, for determining when to switch and route said data packets to said uplink interface, and for determining when to switch and route said data packets to said terrestrial connection interface.

6. A satellite communication system for allowing users to communicate with each other using at least one satellite in a constellation of interconnected satellites, said satellite communication system including a plurality of common ground stations which operate as termination nodes, wherein an improved satellite communication system comprises:

multiple ground stations located proximate to a surface of an earth, wherein a ground station of said multiple ground stations comprises at least one intelligent switch which allows said ground station to couple at least one satellite in said constellation to couple to another ground station of said multiple ground stations and said ground station sends data packets over an uplink communication channel when said uplink communication channel is not experiencing a problem and sends data packets over a terrestrial link to said another ground station when a problem exists with the uplink communication channel without converting said data packets to a format which is compatible with existing terrestrial telephone networks.

* * * * *